(12) United States Patent
West

(10) Patent No.: US 6,359,225 B1
(45) Date of Patent: Mar. 19, 2002

(54) SURGE CLAMP FOR BUSWAY DEVICES AND METHOD OF MAKING SAME

(75) Inventor: Rodney Joe West, Liberty, IN (US)

(73) Assignee: Square D Company, Palatine, IL (US)

( * ) Notice: Subject to any disclaimer, the term of this patent is extended or adjusted under 35 U.S.C. 154(b) by 691 days.

(21) Appl. No.: 08/711,614

(22) Filed: Sep. 10, 1996

(51) Int. Cl.[7] ................................................. H02G 3/00
(52) U.S. Cl. ..................................................... 174/72 B
(58) Field of Search ........................ 174/34, 68.1, 68.2, 174/68.3, 70 B, 72 B, 99 B, 129 B; 361/825, 611, 624, 637, 648, 675; 52/179, 177, 720.1, 739.1

(56) References Cited

U.S. PATENT DOCUMENTS 4,705,334 A * 11/1987 Slicer et al. ................ 439/210
5,203,135 A * 4/1993 Bastian ......................... 52/726
5,580,014 A * 12/1996 Rinderer ....................... 248/49

* cited by examiner

*Primary Examiner*—Joseph Waks
(74) *Attorney, Agent, or Firm*—David R. Stacey; Larry T. Shrout; Larry I. Golden

(57) ABSTRACT

A surge clamp for use on sectionalized electrical busway distribution system housings. The surge clamp is cut to length from an extruded rawstock. The extruded rawstock is provided with at least one generally flat longitudinal surface for engaging a generally flat surface of the busway housing duct top and duct bottom. The extruded rawstock also defines a passage extending along its longitudinal axis. The passage receives a fastening device such a screw at each end for attaching the surge clamp to the busway housing.

11 Claims, 5 Drawing Sheets

SURGE CLAMP FOR BUSWAY DEVICES AND METHOD OF MAKING SAME

FIELD OF THE INVENTION

This invention relates to busway electrical distribution systems and more specifically to structural housing supports for busway devices.

BACKGROUND OF THE INVENTION

Busway electrical distribution systems are well known in the art of electrical distribution. Busway systems are comprised of a number of factory assembled sections each including a number of individually insulated generally flat electrical conductors or busbars stacked one upon another and enclosed within a housing which provides protection and support for the busbars. Each housing includes a duct top and a duct bottom which cover the flat surfaces of the bus bars and two duct sides which cover the edges of the bus bars. The duct tops and bottoms can be made of electrically conductive material such as aluminum or copper for carrying the system ground current. The duct sides are generally made of steel formed to provide strength to the housing. The housing is generally held together by screws and nuts, rivets, stitching or other similar methods. The width of the enclosure is determined by the width of the busbars and the number of busbar stacks enclosed within the housing. During a short circuit, magnetic forces around the busbars tend to push the busbars away from each other, thereby causing the tops and bottoms to bulge. High short circuits can cause the housing to be pulled apart. To prevent or limit short circuit damage surge clamps are placed across the duct tops and bottoms at each end of the busway section and at predetermined intervals between the ends. The surge clamps are generally U-shaped in cross-section with flanges closing the ends and formed from 12 Ga. or 14 Ga. sheet or strip steel. The surge clamps are fastened to the duct sides by means such as screws which pass through the duct side and into the surge clamp end flanges. The length of the surge clamp is determined by the width of the busway enclosure on which it is to be used. Since there are a number of enclosure widths, there must also be a like number of surge clamp lengths. Therefore, large quantities of each surge clamp length must be made and stored in inventory to maintain an adequate supply for production line usage. Manufacturing of surge clamps requires shearing blanks for each required length, forming each blank into a surge clamp, painting the formed surge clamp with an acceptable corrosion resistant coating and placing the finished surge clamps, sorted by length (or part number), into inventory. In some cases the end and side flanges are welded together to give additional strength to the surge clamp. This is a time consuming process, and since at least four surge clamps are required for each busway section, large quantities of each surge clamp length are manufactured at one time and placed in inventory to prevent a busway production line stoppage due to shortages of a particular surge clamp. Also, having to maintain a large inventory of parts is expensive since it requires manufacturing time to make the surge clamps and storage space to store the surge clamps until needed. It would therefore be desirable to have surge clamps which can be manufactured in minutes as needed from a common rawstock, thus eliminating the need for an extensive manufacturing process and a large inventory of many different parts.

SUMMARY OF THE INVENTION

The surge clamps of the present invention can be manufactured as required in a matter of minutes on or near the busway assembly line thereby eliminating the blank shearing, forming, painting and storing of finished parts. An extruded surge clamp rawstock is provided in lengths easily handled by one person. Each surge clamp is made by cutting the surge clamp rawstock off at the required surge clamp length by using a shearing die or an abrasive cutoff saw. Thus the only inventory requirement is for the extruded rawstock which is used for all surge clamp lengths. The surge clamp rawstock is preferably a corrosion resistant material such as aluminum and therefore requires no additional corrosion protection.

Other features and advantages of the invention will become apparent to those skilled in the art upon review of the following detailed description, claims and drawings.

Figure 1:
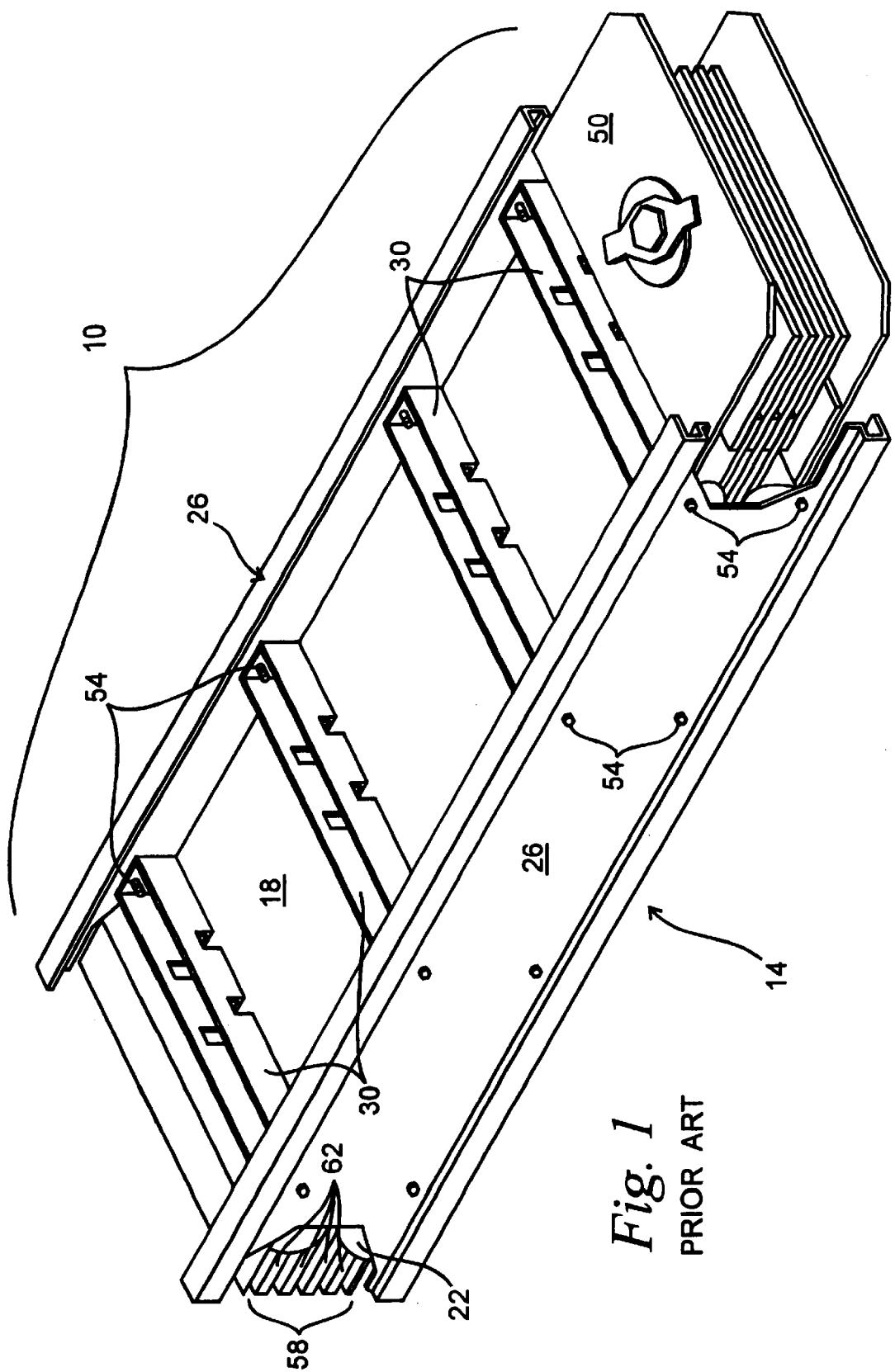
FIG. 1 is an isometric view of a surge clamp of the prior installed on a busway section.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a typical busway section of a sectionalized busway electrical distribution system known in the art and generally indicated by reference numeral 10.

The busway section 10 consists of a housing generally indicated by reference numeral 14. The housing 14 includes a duct top 18, a duct bottom 22, two generally parallel duct sides 26 extending along the longitudinal dimension of the busway section 10 and a number of surge clamps 30 which are placed across the duct top 18 and duct bottom 22 at each end of the busway section 10 and at predetermined intervals between the ends.

Figure 2:
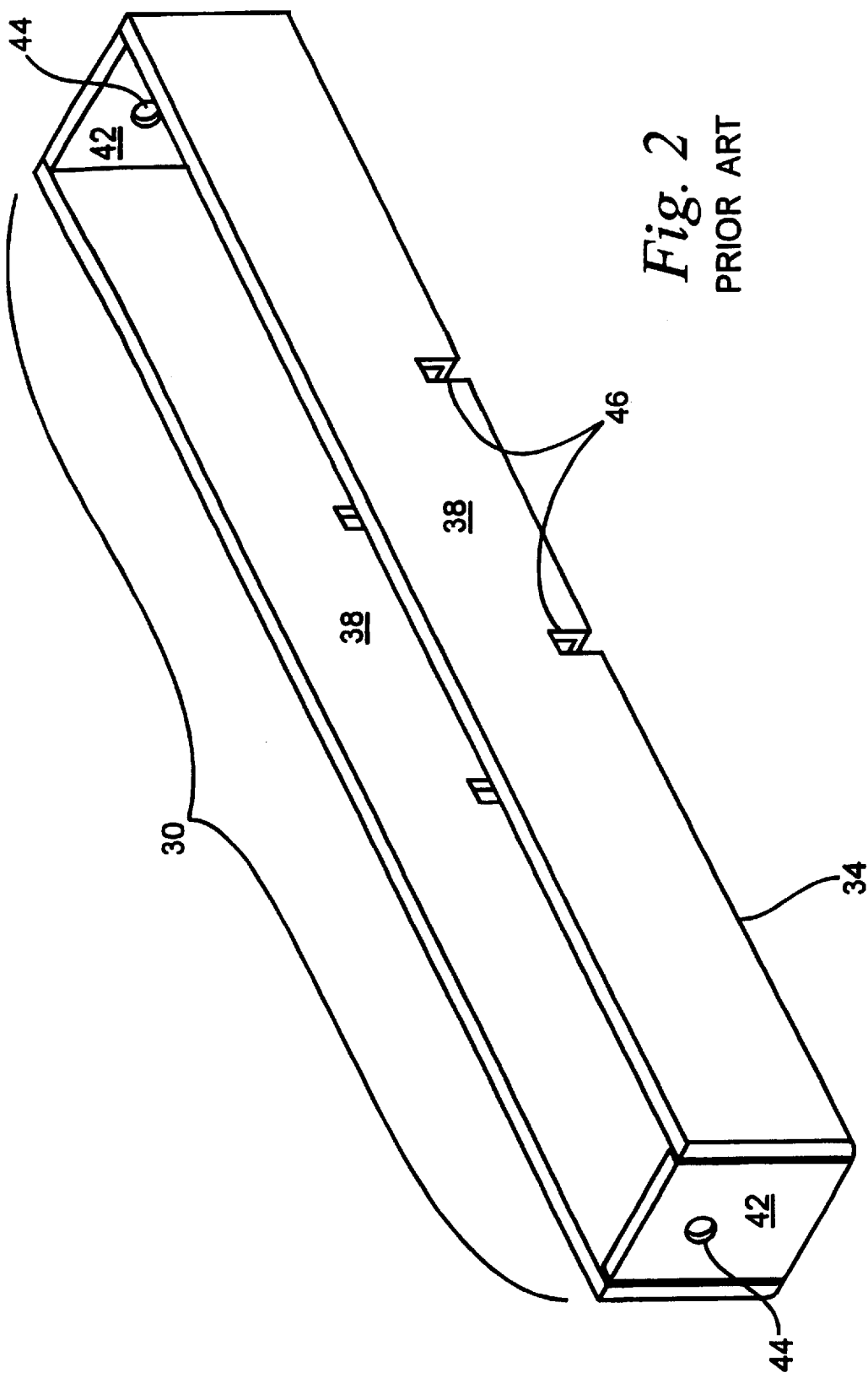
FIG. 2 is an isometric view of a surge clamp of the prior art.
Figure 4:
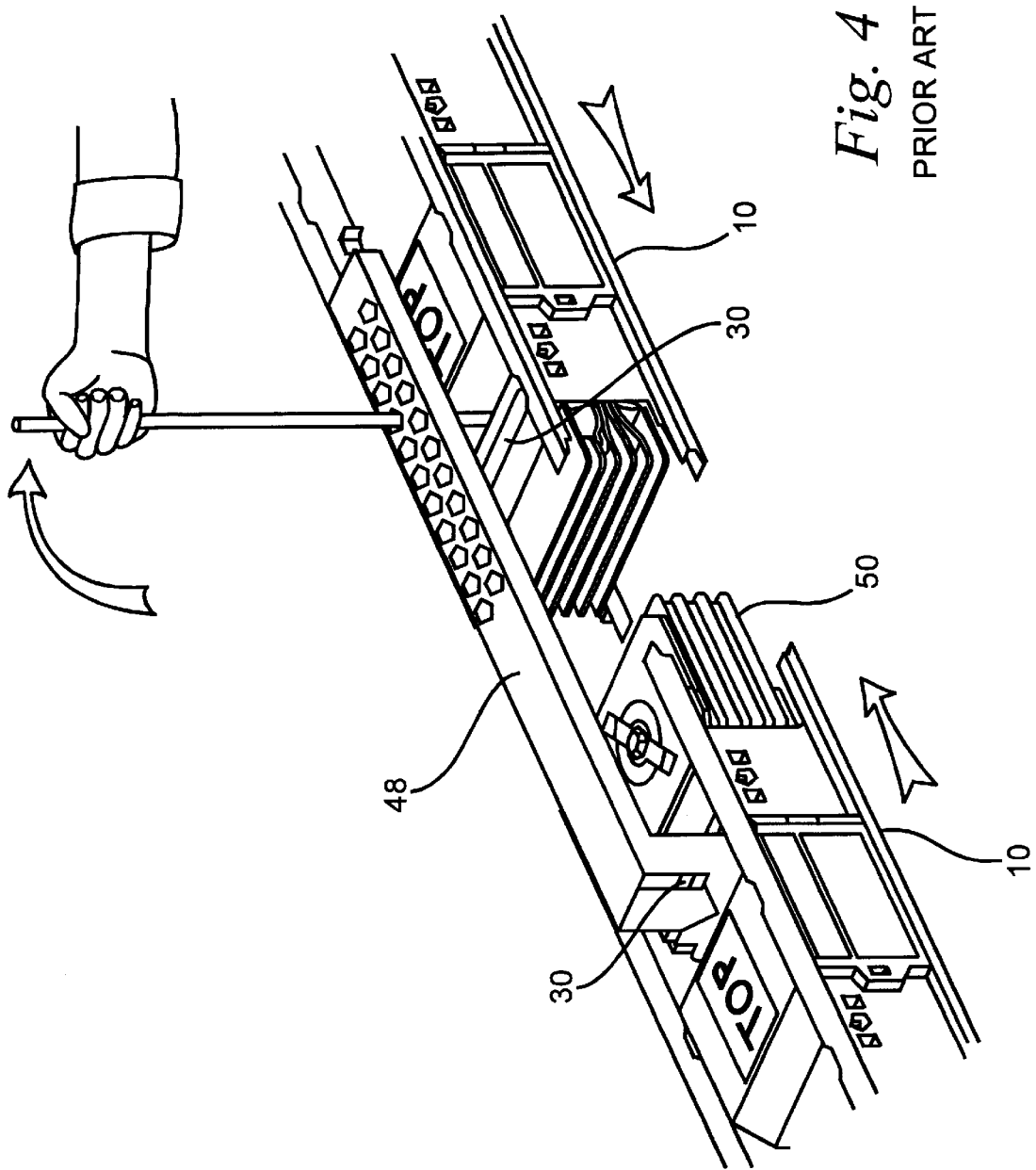
FIG. 4 illustrates the use of a busway assembly tool in assembling adjacent busway sections during the installation of a sectionalized busway electrical distribution system.
Figure 5:
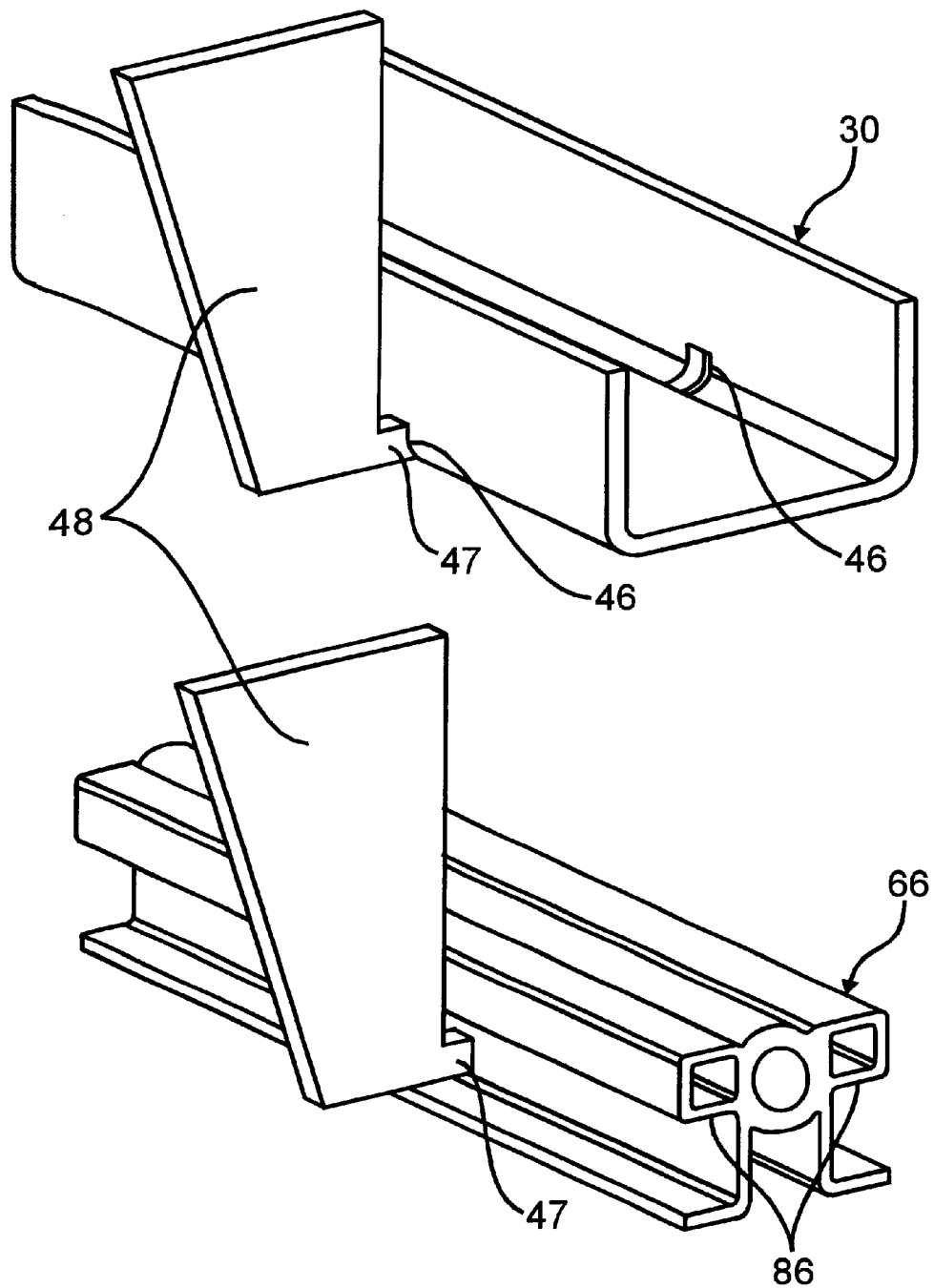
FIG. 5 illustrates in detail the engagement of the busway assembly tool with the prior art surge clamps and with the extruded surge clamps of the present invention.

Referring now to FIG. 2, the surge clamps 30 are formed from 12 Ga. or 14 Ga. sheet or strip steel. The surge clamp 30 is a channel like structure having a generally flat bottom 34 and two generally parallel sides 38 extending perpendicularly from the flat bottom 34 along its longitudinal dimension. Two end flanges 42 extend generally perpendicularly from the flat bottom 34 and intermediate the two parallel sides 38. The end flanges 42 close off the channel and in some cases are welded to the parallel sides 38 for additional strength. Each end flange 42 has a hole 44 which provides a means of attaching the surge clamp 30 to the duct sides 26. The surge clamp 30 may also include a number of slots 46 located in the parallel sides 38 at its intersection with the flat bottom 34 for receiving one or more hooks 47 of a busway assembly tool 48, as shown in FIG. 5. The busway assembly tool 48 spans the area between two adjacent busway section ends such that the assembly tool can be used as a lever to pull the two busway section ends together into a joint connector 50 (see FIG. 4).

Referring again to FIG. 1, each surge clamp 30 is positioned intermediate and generally perpendicular to the parallel duct sides 26 and rests firmly against either the duct top 18 or duct bottom 22. The surge clamps 30 are attached to the duct sides 26 by thread cutting screws 54 or similar attaching means passing through the duct sides 26 and into the holes 44 of the end flanges 42.

Enclosed within the housing 14 is a conductor stack 58.

The conductor stack 58 is composed of a number of individually insulated generally flat electrical conductors 62 or busbars. These conductors 62 are arranged one upon another to form the conductor stack 58. Generally one conductor 62 is provided for each electrical phase of the distribution system. However, in high current systems the housing 14 may enclose multiple conductor stacks 58 placed side by side within the housing 14. The total system current is divided generally equally between the conductor stacks 58. The width of the housing 14 is determined by the width of duct top and bottom, 18 and 22 respectively, which in turn is determined by the width of the conductors 62 and the number of conductor stacks 58 within the housing 14. Therefore, the length of each surge clamp 30 will be determined by the particular width of the housing 14 on which it is to be installed.

Figure 3:
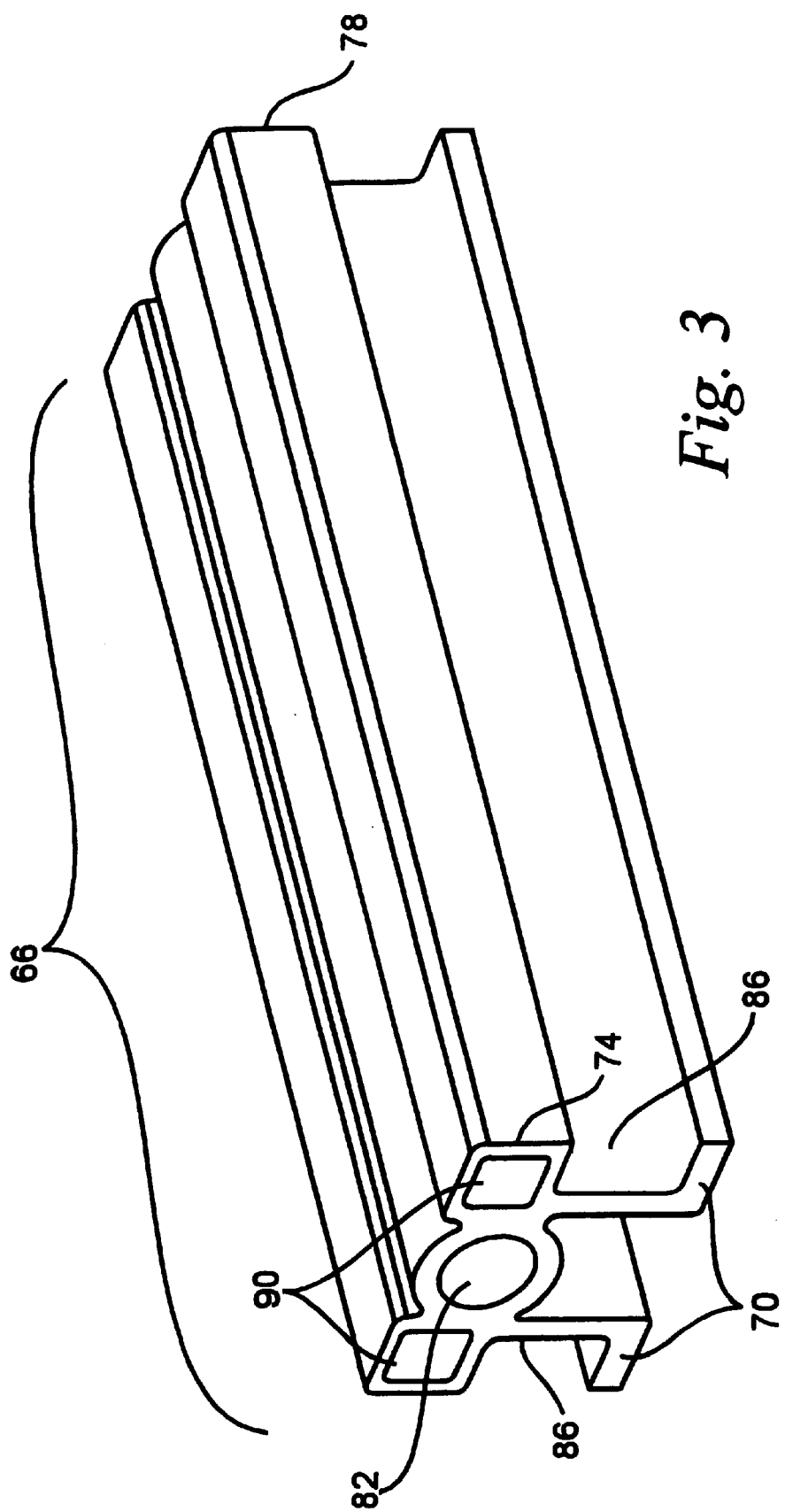
FIG. 3 is an isometric view of a surge clamp in accordance with the present invention.

Referring now to FIG. 3, an extruded surge clamp in accordance with the present invention is illustrated and generally indicated by reference numeral 66. The surge clamp 66 is made from an extruded rawstock provided in lengths suitable for easy handling by one person. The surge clamp 66 requires no blank shearing, forming or painting. The surge clamp rawstock is cut to the required length for use on a particular surge clamp 66 buyway housing 14 by a shearing die or an abrasive cutoff saw. The surge clamp 66 has at least one generally flat surface 70 extending between a first 74 end and a second end 78 for engaging the generally flat surfaces of duct top and duct bottom, 18 and 22 respectively. The surge clamp 66 also defines a passage 82 extending generally along its longitudinal axis between the first and second ends, 74 and 78 respectively. Generally tubular portions 90 are defined along each side of the passage 82 and extend between the first and second ends, 74 and 78, respectively, of the surge clamp 66. These tubular portions 90 provide additional structural strength to the surge clamp 66 along both the horizontal and vertical cross-sectional axes. The extruded surge clamps 66 are assembled to the busway housing 14 in the same manner as the formed surge clamp 30 of FIG. 1. The flat surfaces 70 are placed firmly against the generally flat surfaces of the busway housing duct top and duct bottom, 18 and 22 respectively, and fastening devices such as the screws 54 of FIG. 1 pass through the duct sides 26 and are received in the passage 82 at each of the first and second ends, 74 and 78 respectively. The extruded surge clamp 66 is also provided with an undercut 86 extending along each side between the first and second ends, 74 and 78 respectively. The undercuts 86 are defined by the tubular portions 90 and the generally flat surface 70. The under cut 86 receives the hooks 47 of the busway assembly tool as did the slots 46 of the formed surge clamp 30. The additional structural strength provided by the tubular sections 90 along the horizontal cross-sectional axis is required when the busway assembly tool 48 is leveraged against the surge clamps 66 of two adjacent busway sections 10 to pull the two adjacent busway sections 10 together (see FIG. 4).

I claim:

1. A surge clamp for use on a number of busway housings each having a particular width, said surge clamp comprising:
    an extruded form being cutable to a length determined by the particular width of any one of the busway housings on which it is to be used, said extruded form having at least one generally flat surface extending along a longitudinal axis of said surge clamp for continuously engaging a generally flat surface of said any one of the busway housings and defining a centrally located passage extending longitudinally from a first end of said surge clamp to a second end of said surge clamp.

2. The surge clamp of claim 1 wherein each of said first and second ends abut a particular portion of said any one of the busway housings when said generally flat surface of said surge clamp engages said generally flat surface of said any one of the busway housings.

3. The surge clamp of claim 2 wherein said passage receives a screw at each of said first and second ends and wherein said screws each pass through said particular portions of said any one of the busway housings for attaching said surge clamp to said any one of the busway housings.

4. The surge clamp of claim 1 wherein said surge clamp includes at least one undercut extending between said first and second ends for receiving a portion of a busway assembly tool.

5. A surge clamp for use on a busway housing, said surge clamp comprising:
    an extruded form being cutable to a length determined by a particular width of the busway housing, thus forming a surge clamp having a length equal to said particular width of the busway housing, said extruded form having at least one generally flat surface extending along a longitudinal axis of said surge clamp for continuously engaging a generally flat surface of the busway housing, said extruded form further defining a centrally located passage extending longitudinally from a first end of said surge clamp to a second end of said surge clamp.

6. The surge clamp of claim 5 wherein each of said first and second ends abut a particular portion of the busway housing when said surge clamp is placed across the busway housing and said generally flat surface of said surge clamp engages said generally flat surface of the busway housing.

7. The surge clamp of claim 6 wherein said passage receives a screw at each of said first and second ends and wherein said screws each pass through said particular portion of the busway housing for attaching said surge clamp to the busway housing.

8. The surge clamp of claim 5 wherein said extruded form further defines a tubular portion extending between said first and second ends of said surge clamp and being generally parallel to said passage.

9. The surge clamp of claim 8 wherein said extruded form includes at least one undercut defined by said tubular portion and said flat surface, said undercut extending between said first and second ends of said surge clamp, said undercut receiving a portion of a busway assembly tool such that adjacent busway sections can be leveraged together during the installation of a busway system.

10. A surge clamp for use on a busway housing, said surge clamp comprising:
    an extruded form having a first end and a second end and defining at least one generally flat longitudinal surface, a longitudinally extending passage and at least one longitudinally extending tubular portion being immediately adjacent and generally parallel to said passage, said extruded form being cutable into a plurality of surge clamps, each said surge clamp having a particular length determined by the particular width of the busway housing on which said surge clamp is to be used, each said surge clamp being positioned transversely on the busway housing such that said generally flat surface continuously engages a generally flat surface of the busway housing.

11. A surge protection device for limiting structural damage which can be incurred by a busway housing and its enclosed electrical conductors during an electrical short circuit, said surge protection device comprising:

an extruded form having at least one generally flat longitudinal surface and defining a centrally located passage extending longitudinally through said extruded form, said extruded form being cutable into a plurality of surge clamps, each one of said plurality of surge clamps having a particular length determined by a particular width of the busway housing on which said surge clamp is to be used, said surge clamps being transversely positioned on the busway housing such that said flat surface continuously engages a generally flat surface of the busway housing.

* * * * *